United States Patent [19]

Teale

[11] Patent Number: 5,358,325

[45] Date of Patent: Oct. 25, 1994

[54] ROBOTIC SYSTEM

[75] Inventor: David C. Teale, Winchester, England

[73] Assignee: International Business Machines Corporation, Armonk, N.Y.

[21] Appl. No.: 884,580

[22] Filed: May 18, 1992

[30] Foreign Application Priority Data

Jul. 1, 1991 [EP] European Pat. Off. ......... 91305924.2

[51] Int. Cl.⁵ .............................................. A47B 81/00
[52] U.S. Cl. ..................................... 312/287; 312/295
[58] Field of Search ...................... 312/287, 291, 9.12, 312/9.29, 295

[56] References Cited

U.S. PATENT DOCUMENTS

| 4,699,272 | 10/1987 | Kokubo | 312/287 |
| 4,864,511 | 9/1989 | Moy et al. | 364/478 |
| 5,158,345 | 10/1992 | Baur | 312/9.12 |

Primary Examiner—Kenneth J. Dorner
Assistant Examiner—Gerald A. Anderson
Attorney, Agent, or Firm—M. W. Schecter

[57] ABSTRACT

A robotic system has a transfer bay through which objects may be exchanged with a robot. An internal door allows the robot to access the transfer bay and an external door allows access to the transfer bay from the exterior. The external door can only be opened when the internal door is closed and when the robot is denied access to the transfer bay. This means that personnel inputting or outputting objects to the robotic system cannot come into contact with the robot. When the robotic system is an automated storage library the transfer bay may comprise any number of available storage shelf bays and thus the size of the transfer bay may be varied.

7 Claims, 1 Drawing Sheet

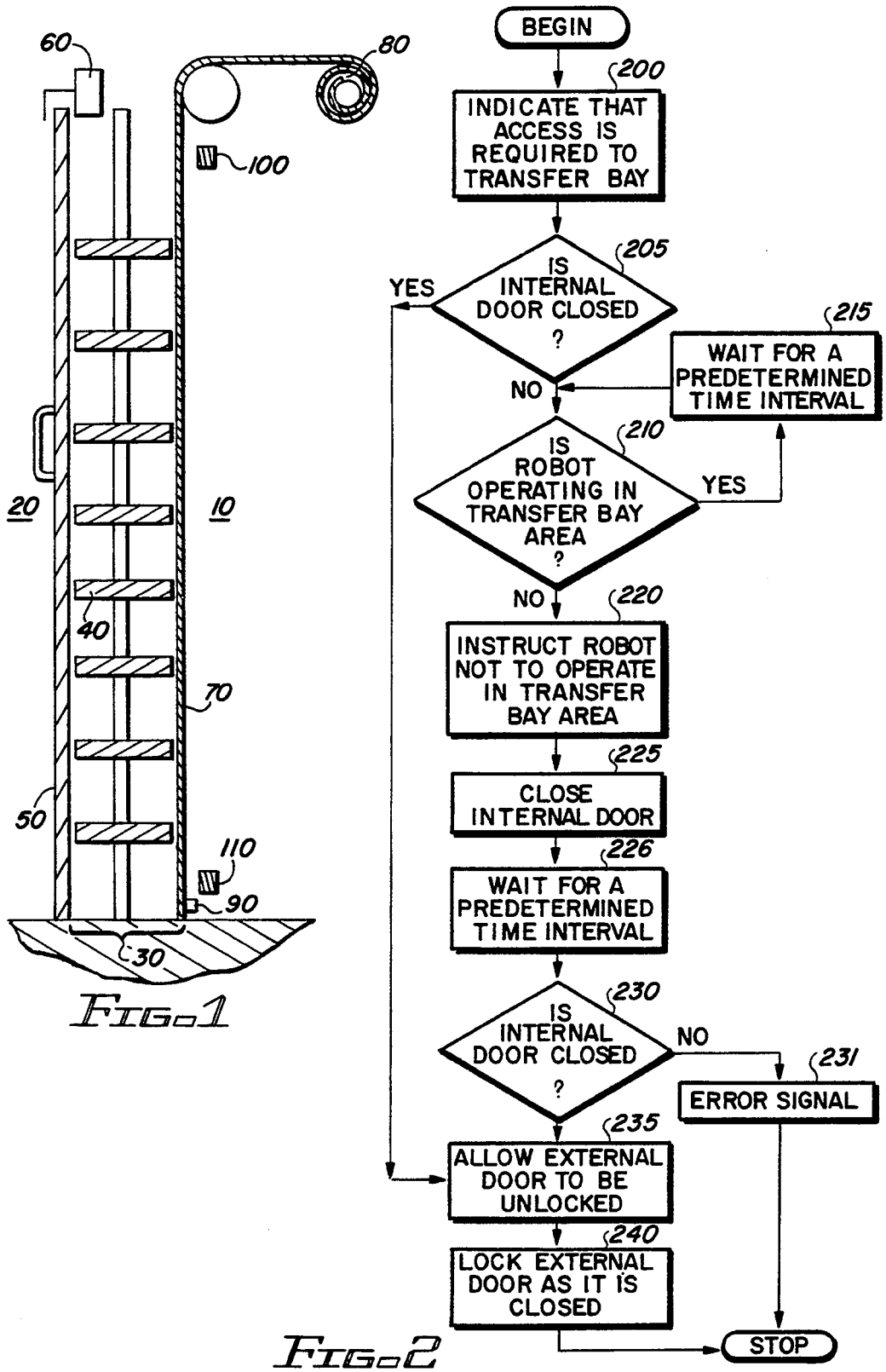

ROBOTIC SYSTEM

BACKGROUND OF THE INVENTION

1. Field of the Invention

The present invention relates generally to a robotic system. More particularly the present invention relates to a method and apparatus for exchanging an object or piece between a robot in the robotic system and the exterior of the robotic system.

2. Description of Related Art

Many robotic systems facilitate the assembly and manipulation of a variety of components or objects. It is necessary that such robots have a way of exchanging these objects with the outside world and have a ready supply of components with which to operate when required to. It is also necessary, from a safety point of view, that personnel are not present in the vicinity of a robot while it is operating. Many industrial robots are extremely heavy and are programmed to perform their operations regardless of any stray or careless personnel entering their environment. A problem exists therefore in how to transfer components to and from a robot without endangering personnel.

One approach has been to contain the robot behind a locked screen, and having a common key for unlocking the screen and operated. The robot can only be operated if the screen is locked and the key is inserted. This means that the robot has to be deactivated before the screen can be unlocked and components can be supplied to or retrieved from the robot usually by personnel entering the robot's operating area.

A disadvantage of this system is that the robot must be stopped each time it is to be supplied with components or components are to be retrieved. This is contrary to the purpose of many robots which is to provide continuous manufacture or other such service.

Another approach has been to supply a robot with components by means of a conveyor belt or other equivalent transport mechanism which becomes inaccessible to personnel when it enters the robot's operating area. This approach is particularly suitable for a robot carrying out a repetitive task and requiring a constant supply of components. Manipulated components are retrieved from the robot by means of an output conveyor belt. Such systems are not suited to many situations in view of their size, complexity and the nature of the task being performed.

However, not all robot systems require a constant stream of supplies, some systems operate in a manner in which they are only supplied or relieved of a component or a batch of components at irregular time intervals. One such system is an automated storage library in which data storage media are transported between storage shelves and read/write devices by a robot. An automated storage library is usually a memory subsystem of a larger data processing system. When data is required by the data processing system the robot is instructed to retrieve a data storage medium, which may be a tape cartridge, and load it into a read/write device so that the data may be accessed by the data processing system.

In an automated storage library there exists a problem of how to introduce or retrieve data storage media from the library without having to stop the operation of the robot, since this would impede the operation of the associated data processing system. It is necessary that any personnel transporting data storage media to the library cannot come into contact with the moving robot.

U.S. Pat. No. 4,864,511 describes an automated storage library enclosed within a circular shelving arrangement. A section of the shelves hinges outward to expose storage racks to the exterior. As the shelf swings outward an articulated wall portion blocks the arc vacated by the hinged shelf. This allows data storage media to be placed in or retrieved from the library while allowing the robot to continue its operations, partitioned from personnel.

A disadvantage of this configuration is that it is mechanically complex. Also, the swinging shelf makes it prone to errors such as the door movement dislodging the data storage media and distortion of the hinge mechanism causing misalignment. Compensatory measures such as shock absorbers for preventing the door from being slammed shut and thus dislodging media from the shelves and means for supporting the shelves to try and prevent distortion of the hinge and misalignment of the shelves can reduce but not eliminate such problems.

SUMMARY OF THE INVENTION

Viewed from one aspect the present invention provides a robotic system having a transfer bay through which a piece may be exchanged between a robot in said robotic system and the exterior, comprising: an internal door through which said robot may access said transfer bay; an external door through which said transfer bay may be accessed from the exterior; means for controlling said doors such that said external door may only be open when said internal door is closed; and means for instructing said robot not to access said transfer bay when said internal door is closed.

This arrangement does not utilize a swinging shelf and therefore more accurate retrieval of parts by the robot can take place because there is less chance of misalignment or accidental dislodging of the pieces.

The transfer bay may comprise a raised platform or the floor or any other means for supporting a component. However in preferred embodiments the transfer bay includes shelves with open-ended storage cells within which a piece may be placed and accessed in a first direction by a robot and in a second direction from the exterior. This provides advantageous increase in the transfer capacity and positive location for the pieces.

Preferably the transfer bay has a designated input area and a designated output area. This reduces the likelihood of operator retrieving the wrong piece from the transfer bay.

BRIEF DESCRIPTION OF THE DRAWING

In order that the invention will be fully understood preferred embodiments thereof will now be described, by way of example only, with reference to the accompanying diagrams in which:

FIG. 1 shows a sectional view of the transfer bay of a robotic system.

FIG. 2 shows a flow diagram illustrating the steps undertaken in order for external access to be given to the transfer bay.

DETAILED DESCRIPTION OF THE DRAWING

The invention finds particular, but not exclusive, application to an automated storage library and will thus be described as embodied in such.

Area 10 of the diagram refers to the operating area or domain of a robot or picker device inside the automated storage library. Area 20 refers to the exterior of the automated storage library. The transfer bay through which components or pieces or, in this embodiment, data storage cartridges are exchanged is shown by 30. The transfer area 30 comprises a set of shelves 40 similar to other shelves in the automated storage library on which the data cartridges are retained. However the shelves 40 are characterized in that they have open-ended storage cells allowing access from more than one side. In other embodiments the transfer bay may comprise a raised platform or just the floor or any other means for supporting a component.

An external door 50 allows access to the transfer bay from the exterior. A safety door latch 60 controls the opening and closing of the external door. The door 50 is latched in the locked position unless a predetermined routine is undertaken. (The predetermined routine will be described below).

The robotic picker device accesses the shelves 40 through an internal door 70. The door 70 is a roller shutter type door which is conveniently stored on roller 80 when in the open position, thereby not obstructing the robot and not impeding premium space within the automated storage library. Located on the internal door near the floor edge is a knock off bar 90. This cooperates with a top limit switch 100 and a bottom limit switch 110, both of which are connected to the operating system software which manages the transfer of data cartridges within the library. The limit switches are used to determine whether the internal door is in the open or closed position.

The process for introducing a data cartridge into the automated storage library will now be described with reference to FIG. 2. Firstly, an operator indicates at 200 to the library control software that he wants to access the transfer bay. This may be done by pressing a button (not shown) adjacent to the exterior door or by entering a command via a keyboard (not shown) directly to the control software. A check is then made at step 205 as to whether the internal door is closed. If the internal door is not detected to be closed a check is made at step 210 as to whether the robot is operating in the transfer bay. If the robot is operating in this area then a predetermined time interval is allowed to lapse 215 and step 210 is repeated. Steps 210 and 215 are repeated until the robot is no longer operating in the transfer bay. The robot is instructed at step 220 not to operate in the transfer area. The internal door is then closed at step 225. A predetermined time interval 226, which relates to the time taken for the internal door to close, is then allowed to lapse. As a safety precaution, a check is made at step 230 to make sure that the internal door is closed. If the internal door is not detected to be closed then an error signal 231 is issued to indicate that manual intervention may be required. If the internal door is detected to be closed, the external door is unlocked at step 240 thereby allowing safe external access to the transfer bay without the hazard of an operator coming into contact with the robot. As a further safety measure the external door preferably locks as soon as it is closed. This means that the checks in FIG. 2 are repeated before the external doors can be unlocked. If no subsequent action has been taken between the external doors locking and a further request for external access to the transfer bay, the internal door will still be closed at step 205 and the external door will be unlocked at step 240.

When external access is no longer required and to enable the robot to retrieve any data cartridges left for it in the transfer area it is necessary for the operator to indicate this to the control software. This may be done by means of a button or via a keyboard. A check is then made to make sure that the external door is locked in the closed position. The internal door is then opened and the robot is instructed that it may again access the transfer bay.

In the automated storage library described, the transfer bay may comprise any number of available storage shelf bays and thus the input and/or output areas may be chosen accordingly.

While the invention has been particularly shown and described with reference to preferred embodiments thereof, it will be understood by those skilled in the art that various changes in form and details may be made therein without departing from the spirit and scope of the invention. Thus, the invention herein disclosed is to be limited only as specified in the following claims.

What is claimed is:

1. A robotic system comprising:
   a housing separating an interior from an exterior;
   a robot in the interior;
   a transfer bay through which a piece may be exchanged between said robot and the exterior;
   an internal door through which said robot may access said transfer bay;
   an external door through which said transfer bay may be accessed from the exterior;
   means for controlling said doors such that said external door may only be open when said internal door is closed; and
   means for instructing said robot not to access said transfer bay when said internal door is closed.

2. A robotic system as in claim 1 wherein said transfer bay includes a plurality of open-ended storage cells within which a piece may be placed and accessed in a first direction by said robot and in a second direction from said exterior.

3. A robotic system as in claim 1 wherein said transfer bay has a designated input area and a designated output area.

4. An automated storage library comprising:
   a housing separating an interior from an exterior;
   a robot, storage shelves, and read devices in the interior, the robot for transporting a data storage medium between the storage shelves and the read devices;
   a transfer bay through which a data storage medium may be exchanged between said robot and the exterior;
   an internal door through which said robot may access said transfer bay;
   an external door through which said transfer bay may be accessed from the exterior;
   means for controlling said doors such that said external door may be open when said internal door is closed; and
   means for instructing said robot not to access said transfer bay when said internal door is closed.

5. A robotic system as in claim 6 wherein said transfer bay includes a plurality of open-ended storage cells within which a data storage medium may be placed and accessed in a first direction by said robot and in a second direction from said exterior.

6. A robotic system as in claim 4 wherein said transfer bay has a designated input area and a designated output area.

7. A robotic system as in claim 4 wherein said transfer bay may be used for permanent storage of said data storage medium.

* * * * *

UNITED STATES PATENT AND TRADEMARK OFFICE
CERTIFICATE OF CORRECTION

PATENT NO. : 5,358,325
DATED : October 25, 1994
INVENTOR(S) : David C. Teale

It is certified that error appears in the above-identified patent and that said Letters Patent is hereby corrected as shown below:

```
     At column 1, line 28, after "and" insert --for inserting
in a control panel before the robot can be--.
```

Signed and Sealed this

Seventeenth Day of January, 1995

Attest:

BRUCE LEHMAN

Attesting Officer

Commissioner of Patents and Trademarks